United States Patent
Matsuyama et al.

(10) Patent No.: US 8,001,358 B2
(45) Date of Patent: Aug. 16, 2011

(54) MICROPROCESSOR AND METHOD OF PROCESSING DATA INCLUDING PEAK VALUE CANDIDATE SELECTING PART AND PEAK VALUE CALCULATING PART

(75) Inventors: Hideki Matsuyama, Kanagawa (JP); Masayuki Daitou, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 414 days.

(21) Appl. No.: 12/222,373

(22) Filed: Aug. 7, 2008

(65) Prior Publication Data

US 2009/0063808 A1    Mar. 5, 2009

(30) Foreign Application Priority Data

Aug. 31, 2007 (JP) ................................. 2007-226191

(51) Int. Cl.
  *G06F 12/00* (2006.01)
(52) U.S. Cl. ......... 711/200; 711/154; 711/156; 711/221
(58) Field of Classification Search .................. 711/200, 711/154, 156, 221
  See application file for complete search history.

(56) References Cited

U.S. PATENT DOCUMENTS

| | | | | |
|---|---|---|---|---|
| 4,740,914 A | * | 4/1988 | Abrant et al. | 711/200 |
| 5,235,623 A | * | 8/1993 | Sugiyama et al. | 375/241 |
| 5,524,175 A | * | 6/1996 | Sato et al. | 706/41 |
| 5,636,327 A | * | 6/1997 | Nakahira et al. | 706/41 |
| 6,674,798 B2 | * | 1/2004 | Ishihara et al. | 375/240.16 |

FOREIGN PATENT DOCUMENTS

JP    7-56733    3/1995

* cited by examiner

*Primary Examiner* — Stephen C Elmore
(74) *Attorney, Agent, or Firm* — McGinn IP Law Group, PLLC

(57) ABSTRACT

A data storing part outputs n-bit data according to a reading address generated by an address generator. A peak value candidate selecting part selects a maximum value of a plurality of elements forming the n-bit data as a peak value candidate when data of one data unit is expressed as one element and outputs the peak value candidate together with a positional information indicating an element position of the peak value candidate. When the peak value candidate is larger than a peak value held in a peak value holding part, a peak value calculating part calculates an address of the peak value candidate using the positional information of the peak value candidate and a reading address, outputs the address and the peak value candidate to the peak value holding part, and updates content held in the peak value holding part.

20 Claims, 15 Drawing Sheets

MICROPROCESSOR AND METHOD OF PROCESSING DATA INCLUDING PEAK VALUE CANDIDATE SELECTING PART AND PEAK VALUE CALCULATING PART

BACKGROUND OF THE INVENTION

1. Field of the Invention

The present invention relates to a microprocessor, and more specifically, to a technique detecting a maximum value or a minimum value out of a plurality of data, and an address thereof in a microprocessor.

2. Description of Related Art

A microprocessor executes various processings including a process of detecting a maximum value or a minimum value out of a plurality of data stored in a storage means such as a memory, and an address thereof. A technique for quickly performing this processing has now been studied.

FIG. 19 shows FIG. 1 of Japanese Unexamined Patent Application Publication No. 07-056733 (related art 1), and shows a microprocessor executing the above processing by a method disclosed in the related art 1. Now, the microprocessor in FIG. 19 will be described by taking a processing detecting the minimum value as an example.

The microprocessor includes a storage device 2 storing data, an address generating circuit 4, an address pointer 6, a table retrieving circuit 10, an input port 43, an input port 44, a computing element 3, and an accumulator 5. The address generating circuit 4 sequentially generates a reading address, and the address pointer 6 sequentially outputs the reading address to the storage device 2. The storage device 2 outputs data stored in the reading address from the address pointer 6. The table retrieving circuit 10 receives the reading address from the address pointer 6 together with the data from the storage device 2. Then the table retrieving circuit 10 inputs the data to an upper bit storing part 43A of one input port 43 in the computing element 3 and inputs the reading address to a lower bit storing part 43B. The accumulator 5 stores a previous calculation result of the computing element 3, and inputs the calculation result to the other input port 44 of the computing element 3. The computing element 3 compares synthetic data (data and address) stored in the input port 43 with previous synthetic data which is the previous calculation result stored in the input port 44, and outputs the smaller value to the accumulator 5 as a new calculation result.

In the technique disclosed in the related art 1, the synthetic data is obtained by setting the data and the address to the upper bit and the lower bit respectively. Then the minimum value is obtained by using the synthetic data, so that the minimum value and the address can be obtained at the same time, whereby the high speed processing is realized.

As the throughput of the microprocessor has been increasing, there is a growing demand for high speed operation. The process for detecting the maximum value or the minimum value is also needs to be performed in high speed. In the technique disclosed in the related art 1, the synthetic data is generated and comparing is performed to obtain the maximum value or the minimum value or the address thereof at the same time. However, the effect of the high speed operation is limited since the data is processed one by one and the execution cycle is required to generate the synthetic data.

SUMMARY

One aspect of the present invention is a microprocessor executing a peak value obtaining process obtaining a peak value which is a maximum value or a minimum value out of a plurality of data. This microprocessor includes an address generator, a data storing part, a peak value candidate selecting part, a peak value holding part, and a peak value calculating part.

The address generator sequentially generates a reading address and outputs the generated reading address.

The data storing part outputs n-bit data having a starting point of the reading address output from the address generator.

The peak value candidate selecting part selects an element including a peak value out of a plurality of elements forming the n-bit data output from the data storing part as a peak value candidate when m-bit (m: multiple integral of an addressing unit) data of one data unit is expressed as one element, and outputs the peak value candidate together with a positional information, the positional information indicating a position of the peak value candidate in an element column in which the plurality of elements are aligned in an address order.

The peak value holding part holds the output of the peak value calculating part, and this output includes a peak value and an address of an element including the peak value.

The peak value calculating part calculates an address of the element of the peak value candidate using the positional information of the peak value candidate and the reading address, outputs the calculated address and the peak value candidate to the peak value holding part, and updates content held in the peak value holding part on a condition that the peak value candidate output from the peak value candidate selecting part and the peak value held in the peak value holding part satisfy a magnitude relation corresponding to an instruction to obtain the maximum value or the minimum value.

The phrase "magnitude relation corresponding to the instruction to obtain the maximum value or the minimum value by the peak value processing" means "peak value candidate>peak value which is being held" in detecting the maximum value and "peak value candidate<peak value which is being held" in detecting the minimum value.

Even when the microprocessor is replaced with a device, a method, a system, or a program, it can still be effective as one aspect of the present invention.

According to the technique of the present invention, it is possible to perform the processing for detecting the maximum value or the minimum value and an address in the microprocessor in higher speed.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Figure 1:
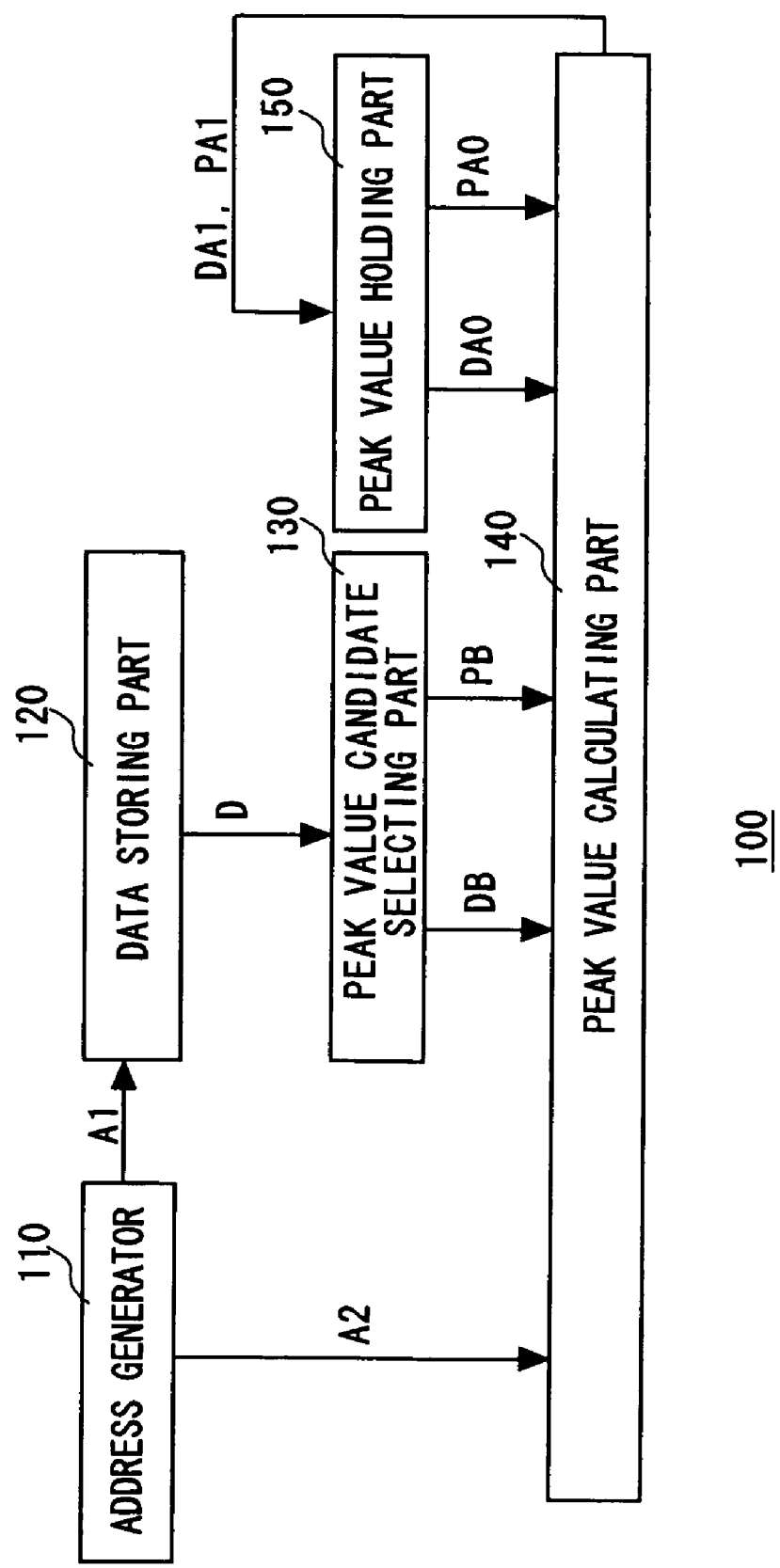
FIG. 1 is a schematic diagram of a microprocessor for describing a principle of the present invention.

Before describing the specific embodiments of the present invention, a principle of the present invention will be described first. FIG. 1 is a schematic diagram of a microprocessor 100 for describing the principle of the present invention. Only the elements of the microprocessor 100 having a relation with the present invention will be described and drawn, and other elements of the microprocessor which are already known will be omitted in order to best describe the principles of the invention.

As shown in FIG. 1, the microprocessor 100 includes an address generator 110, a data storing part 120, a peak value candidate selecting part 130, a peak value calculating part 140, and a peak value holding part 150. The microprocessor 100 detects a maximum value or a minimum value out of data stored in the data storing part 120. Hereinafter, a case of detecting the maximum value by the microprocessor 100 will be taken as an example for the sake of clarity. If we assume that one data unit has m bits (m: integral multiple of addressing unit), the peak value candidate selecting part 130 of the microprocessor 100 processes n-bit data of a plurality of data units at one time. We now assume that the addressing unit has 8 bits, one data unit has 16 bits (m=16) which is twice larger than the addressing unit, and the peak value candidate selecting part 130 processes 64 bits of four data units at one time as an example.

The data storing part 120 is a memory, for example.

The address generator 110 sequentially generates a reading address and outputs the reading address to the data storing part 120 and the peak value calculating part 140. A reading address A1 output to the data storing part 120 by the address generator 110 and a reading address A2 output to the peak value calculating part 140 are not necessarily the same. The two possible structures that can be considered in the address generator 110 shown in FIGS. 2 and 3 will now be described.

Figure 2:
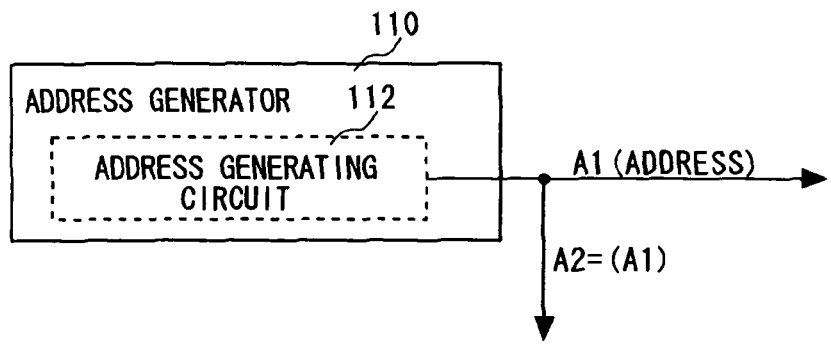
FIG. 2 is a diagram showing a first structure that can be considered in an address generator in the microprocessor shown in FIG. 1.

The address generator 110 shown in FIG. 2 includes an address generating circuit 112 generating a starting address of a plurality of sequential data as the reading address. In this case, the reading address A1 output to the data storing part 120 by the address generator 110 and the reading address A2 output to the peak value calculating part 140 are the same.

Figure 3:
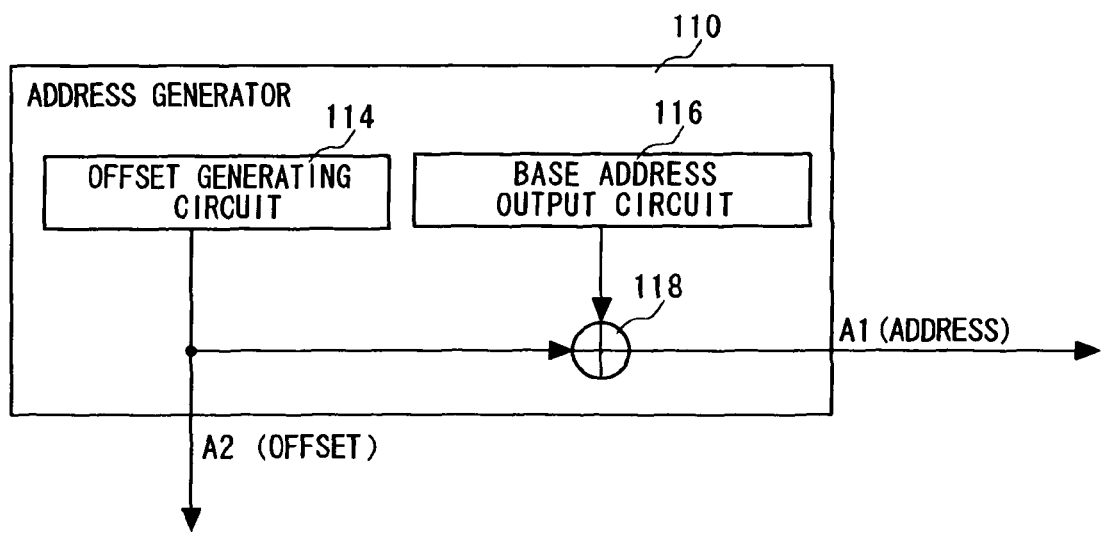
FIG. 3 is a diagram showing a second structure that can be considered in an address generator in the microprocessor shown in FIG. 1.

The address generator 110 shown in FIG. 3 includes an offset generating circuit 114, a base address output circuit 116, and an adder 118. In this case, the reading address A1 output to the data storing part 120 is obtained by the adder 118 by adding an offset output from the offset generating circuit 114 and a base address output from the base address output circuit 116. On the other hand, A2 output to the peak value calculating part 140 can only be the offset output from the offset generating circuit 114.

In the following description, the address output to the peak value calculating part by the address generator can be either the address itself or the offset unless otherwise defined.

The data storing part 120 outputs 64-bit data D having a starting point of the reading address A1 output from the address generator 110 to the peak value candidate selecting part 130.

Figure 4:
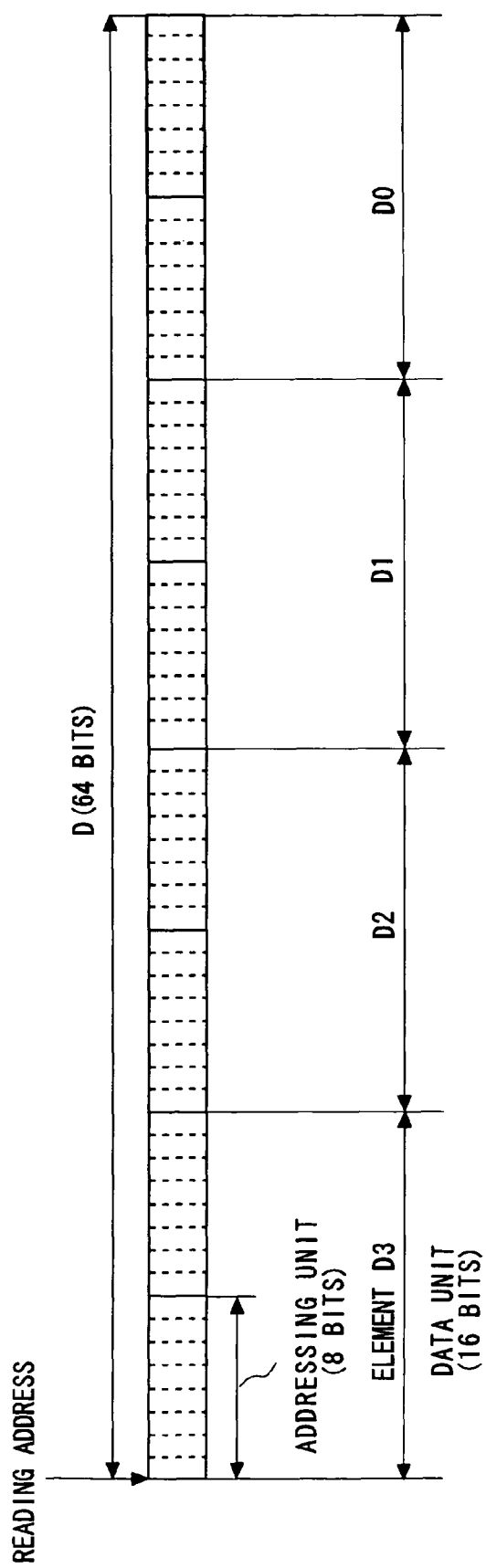
FIG. 4 is a diagram for describing an aspect in which a peak value candidate selecting part in the microprocessor shown in FIG. 1 handles data.

The peak value candidate selecting part 130 equally divides the 64-bit data into four parts in the address order so that one data unit has 16 bits, and 16 bits of one data unit is called one element as shown in FIG. 4. Then the data D is treated as having four elements D0 to D3.

The peak value candidate selecting part 130 performs two processings. One is for detecting the maximum value out of the four elements D0 to D3 as the peak value candidate, and the other is for obtaining the information indicating the position of the element of the peak value candidate in the element column when the four elements are aligned in an address order. Hereinafter, this position is called element position, and the information indicating the element position is called positional information.

Since the address order of the elements D0 to D3 is "D0, D1, D2, D3", the alignment order of the element is also expressed as "D0, D1, D2, D3". The element position means the relative position of the element in the element column of "D0, D1, D2, D3". For example, when D0 is the starting point, each positional information of the elements D0 to D3 can be expressed as "0", "1", "2", "3". On the contrary, when D3 is the starting point, each positional information of the elements D0 to D3 can be expressed as "3", "2", "1", and "0". Now, the description will be made on the case in which D0 is the starting point.

The peak value candidate selecting part 130 outputs an element DB which is the peak value candidate and a positional information PB of the element DB to the peak value calculating part 140.

The peak value calculating part 140 compares the peak value candidate DB output from the peak value candidate selecting part 130 with an element DA0 of the peak value held in the peak value holding part 150. Note that the peak value holding part 150 holds a calculation result of the peak value calculating part 140, and holds a peak value DA0 and an address PA0 of the element of the peak value DA0.

When the peak value candidate DB output from the peak value candidate selecting part 130 is equal to or smaller than the peak value DA0 stored in the peak value holding part 150, the peak value calculating part 140 outputs the content read out from the peak value holding part 150 (peak value DA0 and an address PA0) directly to the peak value holding part 150 as a new peak value and an address (DA1, PA1). On the other hand, when the peak value candidate DB output from the peak value candidate selecting part 130 is larger than the peak value DA0 held in the peak value holding part 150, the peak value calculating part 140 outputs the peak value candidate DB to the peak value holding part 150 as the new peak value DA1. At the same time, the peak value calculating part 140 calculates the address PA1 of the new peak value DA1(DB) according to the following expression (1) using the reading address A2 output from the address generator 110 for reading out the new four elements and the positional information PB of the peak value candidate DB, so as to output the calculated value to the peak value holding part 150. Accordingly, the content held in the peak value holding part 150 is updated.

$$PA1 = A2 + PB^*(\text{data unit/addressing unit}) \quad (1)$$

wherein PA1 is an address of a new peak value,
A2 is a reading address, and
PB is a positional information of the new peak value.

In this example, the data unit is 16 bits and the addressing unit is 8 bits. Therefore, when the element D2 shown in FIG. 4 is selected as the peak value DA0 for example, the address PA1 is expressed as "reading address A2+2*2".

The calculation of "positional information PB*(data unit/addressing unit)" in the above expression (1) may be performed when the peak value candidate selecting part 130 selects the peak value candidate DB to output the positional information PB of the peak value candidate DB. More preferably, the calculation is performed when the peak value calculating part 140 determines the peak value candidate DB as the new peak value. Accordingly, this calculation needs not be performed when the peak value DA0 stored in the peak value holding part 150 is determined as the new peak value instead of the peak value candidate DB, which improves the efficiency.

The above-described process is repeated, and the maximum value and an address are stored in the peak value holding part 150 when the processing of the data stored in the data storing part 120 in a range of detecting the maximum value has been completed. This address may be the address itself or may be the offset.

The description has been made by taking a process of detecting the maximum value as an example. As a matter of fact, the present invention can be applied to a microprocessor executing a process of detecting the minimum value, or a microprocessor executing a process of detecting both the maximum value and the minimum value.

Now we consider a case in which a plurality of data, which means the data of the plurality of data units, are processed at one time by the method of the related art 1. In this case, a method may be considered of generating a plurality of synthetic data by the plurality of data and addresses, and obtaining the peak value by the plurality of synthetic data so as to sequentially perform updating. In this method, since the synthetic data of each data needs to be generated, the number of execution cycles needed to generate the synthetic data increases as there are much data processed at one time. For example, when the four data are processed at one time, although the address of the top data can be obtained from the address pointer, the addresses for the rest of the three data need to be obtained by an adding processing or the like. Hence, a merit obtained by processing the plurality of data in parallel at one time is lessened, which means it is not necessarily possible to surely increase the process speed.

Further, since each synthetic data is formed by the data and an address, the capacity of the storage means which temporarily stores the plurality of synthetic data also increases.

According to the technique based on the present invention, the data of the plurality of data units are read out at one time, so as to obtain the maximum value out of each element forming these data as the peak value candidate and obtain an address from the positional information of the peak value candidate and the reading address when the peak value candidate is determined as the new maximum value. Accordingly, the data of the plurality of data units can be processed at one time, and the address of the detected maximum value can be readily obtained. Further, the calculation of the address is performed only for the peak value candidate determined as the peak value. Therefore, it is possible to obtain the maximum value by a less number of execution cycles than in the technique disclosed by the related art 1.

Further, since each element is data itself and does not include the address, the storage capacity that is needed in the peak value candidate selecting part 130 can be reduced.

Based on the above description, the embodiments in which the principle of the present invention is specified will be described. In the following description, the reading address, the element, the element position, the positional information, and the method of detecting the address from the reading address and the positional information are the same as those described above, and hence the detailed description thereof will be omitted. Further, as in the above description, the number of bits of the addressing unit, the data unit, and the data processed at one time will be set to "8 bits", "16 bits", and "64 bits", respectively, as an example.

First Embodiment

Figure 5:
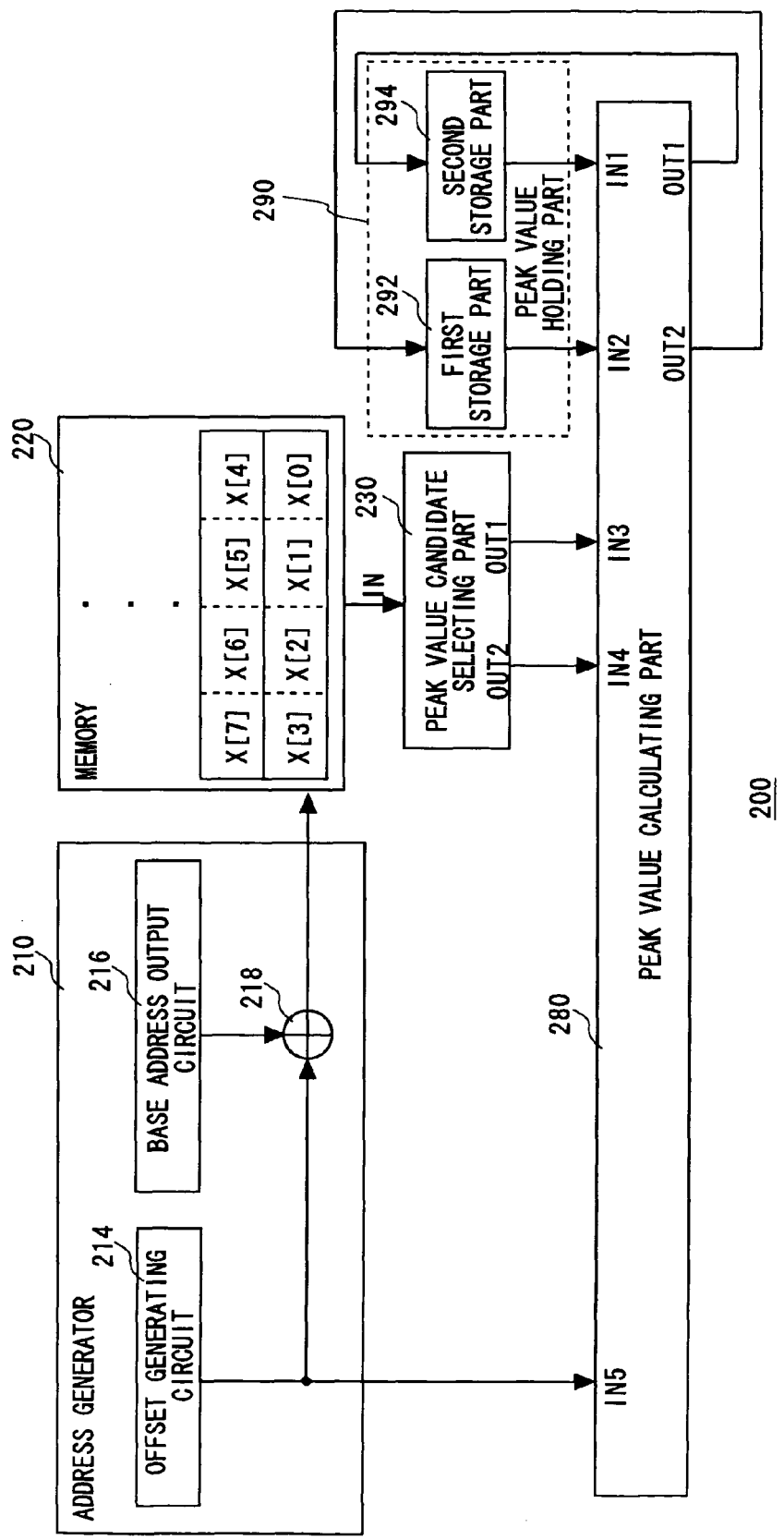
FIG. 5 is a diagram showing the microprocessor according to the first embodiment of the present invention.

FIG. 5 shows a microprocessor 200 according to the first embodiment of the present invention. The microprocessor 200 can detect either one or both of the maximum value and the minimum value. However, it is assumed here that the maximum value is detected for the sake of clarity. As shown in FIG. 5, the microprocessor 200 includes an address generator 210, a memory 220, a peak value candidate selecting part 230, a peak value calculating part 280, and a peak value holding part 290.

The address generator 210 includes an offset generating circuit 214, a base address output circuit 216, and an adder 218. The offset generating circuit 214 sequentially generates the offset and outputs the offset to the adder 218 and to the peak value calculating part 280.

The adder 218 adds the offset from the offset generating circuit 214 and the base address from the base address output circuit 216 to obtain the reading address, and outputs the reading address to the memory 220.

The memory 220 stores a plurality of data X[0], X[1], . . . . One data has 16 bits, which is twice larger than the addressing unit of 8 bits. The memory 220 outputs 64-bit data, which is four data, having the starting point of the reading address from the address generator 210.

The peak value candidate selecting part 230 receives four data from the memory 220 as an input In, and outputs the maximum value out of the four data as Out2. Further, the peak value candidate selecting part 230 outputs the information indicating the element position of Out2 detected as the maximum value, which is the positional information, as Out1 when each of the four data of In is called element.

The peak value holding part 290 includes a first storage part 292 and a second storage part 294, where the maximum value detected by the peak value calculating part 280 and an offset are respectively held.

The peak value calculating part 280 receives the offset from the address generator 210, Out2 which is the maximum value candidate from the peak value candidate selecting part 230, Out1 which is the positional information of the maximum value candidate Out2, the maximum value held in the first storage part 292, and the offset of the element of the maximum value held in the second storage part 294 as inputs In5, In4, In3, In2, and In1, respectively. Then In4 (maximum value candidate) or In2 (maximum value held in the first storage part 292) which is larger than the other one is output to the first storage part 292 as the new maximum value Out2. Further, when the new maximum value Out2 is In2, the peak value calculating part 280 outputs In1 to the second storage part 294 as Out1. On the other hand, when the new maximum value Out2 is In4, the peak value calculating part 280 detects the offset of the maximum value candidate by using the offset (In5) from the address generator 210 and In3 (positional information of the maximum value candidate) and outputs the offset to the second storage part 294 as Out1.

Now, the detailed structure of the peak value candidate selecting part 230 and the peak value calculating part 280 will be described.

Figure 6:
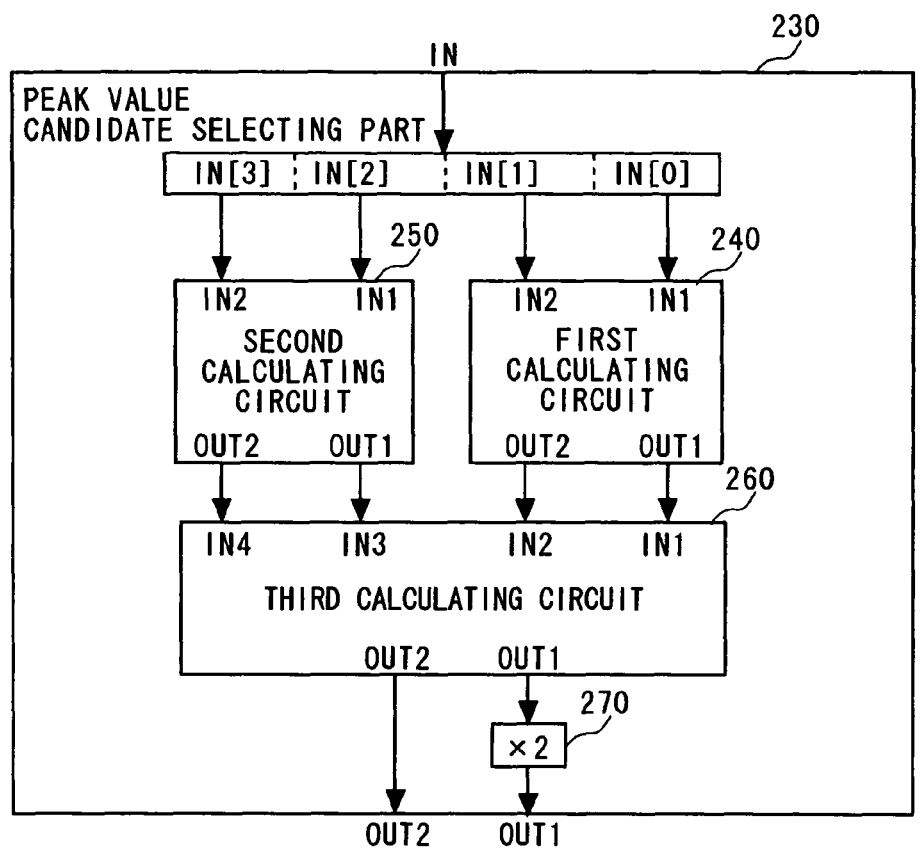
FIG. 6 is a diagram showing a peak value candidate selecting part in the microprocessor shown in FIG. 5.

FIG. 6 shows the peak value candidate selecting part 230. The peak value candidate selecting part 230 includes a first calculating circuit 240, a second calculating circuit 250, a third calculating circuit 260, and a multiplier 270.

The first calculating circuit 240 sets In[1] and In[0] of four elements In[0] to In[3] forming the input In to inputs In2 and In1, respectively, and outputs a larger element of the two inputs and a positional information as outputs Out2 and Out1, respectively.

The second calculating circuit 250 sets In[3] and In[2] of four elements In[0] to In[3] forming the input In to inputs In2 and In 1, respectively, and outputs a larger element of the two inputs and a positional information as outputs Out2 and Out1, respectively.

The third calculating circuit 260 sets the two outputs Out2 and Out1 of the first calculating circuit 240 and the two outputs Out2 and Out1 of the second calculating circuit 250 to inputs In4, In3, In2, and In1, and selects In4 or In2 which is larger as the maximum value candidate to output the selected one as the output Out2 of the peak value candidate selecting part 230. When In4 is selected as the maximum value candidate, the peak value candidate selecting part 230 outputs the positional information In3 to the multiplier 270 as the output Out1. On the other hand, when In2 is selected as the maximum value candidate, the peak value candidate selecting part 230 outputs the positional information In1 to the multiplier 270 as the output Out1.

The multiplier 270 multiplies Out1 (positional information) output from the third calculating circuit 260 by "data unit (number of bits of the element)/addressing unit". In the example of the present embodiment, the data unit is 16 bits and the addressing unit is 8 bits. Accordingly, the multiplier 270 multiplies Out1 output from the third calculating circuit 260 by "2". The multiplier 270 outputs the multiplication result as the output Out1 of the peak value candidate selecting part 230. Note that the multiplier 270 can be configured by a related circuit so long as the multiplier can multiply the output Out1 of the third calculating circuit 260 by "2", and can be a multiplier itself, or can be a left shifter or a computing element or the like.

Figure 7:
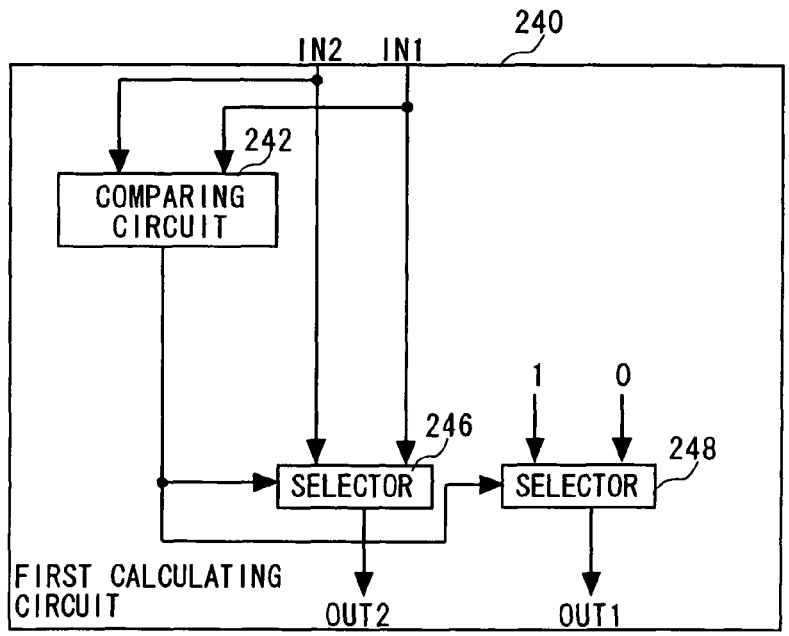
FIG. 7 is a diagram showing a first calculating circuit in the peak value candidate selecting part shown in FIG. 6.

FIG. 7 shows the first calculating circuit 240. The first calculating circuit 240 receives top two elements (In[0] and In[1]) of the four elements In[0] to In[3] as inputs In1 and In2, respectively, and includes a comparing circuit 242, a selector 246, and a selector 248. The comparing circuit 242 compares the input In1 with the input In2, and outputs the signal indicating the comparison result to the two selectors. More specifically, when In2 is larger than In1, for example, the comparing circuit 242 outputs "high". On the other hand, when In2 is equal to or smaller than In1, the comparing circuit 242 outputs "low". The selector 246 selects In2 and outputs In2 as Out2 upon receiving of "high" indicating that In2 is larger than In1 from the comparing circuit 242, and outputs In1 as Out2 upon receiving of "low". Further, the selector 248 outputs the positional information "1" of In2 as Out1 upon receiving of "high" indicating that In2 is larger than In1 from the comparing circuit 242, and outputs the positional information "0" of In1 as Out1 upon receiving of "low".

Figure 8:
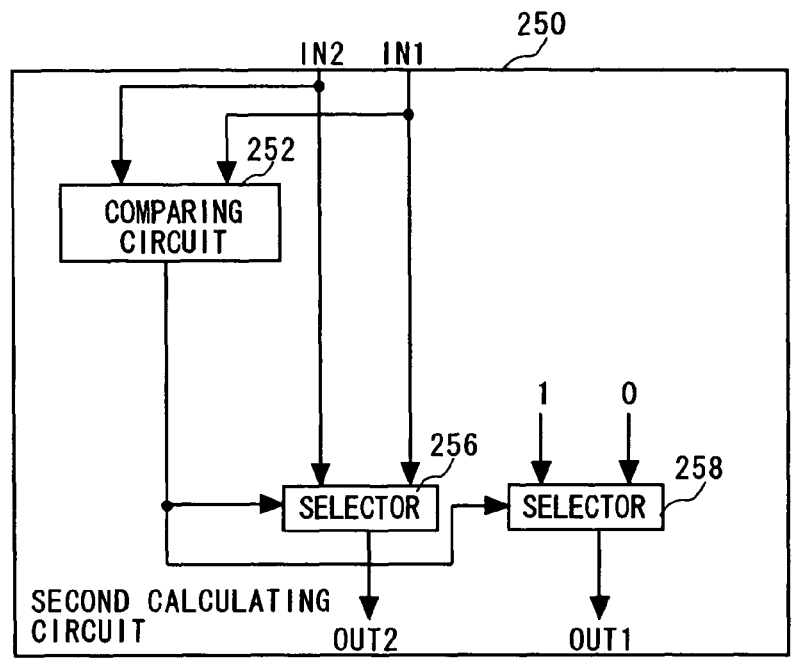
FIG. 8 is a diagram showing a second calculating circuit in the peak value candidate selecting part shown in FIG. 6.

FIG. 8 shows the second calculating circuit 250. The second calculating circuit 250 receives latter two elements (In[2] and In[3]) of the four elements In[0] to In[3] as inputs In1 and In2, respectively, and includes a comparing circuit 252, a selector 256, and a selector 258. The comparing circuit 252 compares the input In1 with the input In2, and outputs the signal indicating the comparison result to the two selectors. More specifically, when In2 is larger than In1, for example, the comparing circuit 252 outputs "high". On the other hand, when In2 is equal to or smaller than In1, the comparing circuit 252 outputs "low" The selector 256 selects In2 and outputs In2 as Out2 upon receiving of "high" indicating that In2 is larger than In1 from the comparing circuit 252, and outputs In1 as Out2 upon receiving of "low". Further, the selector 258 outputs "1" as Out1 upon receiving of "high" indicating that In2 is larger than In1 from the comparing circuit 252, and outputs "0" as Out1 upon receiving of "low".

Figure 9:
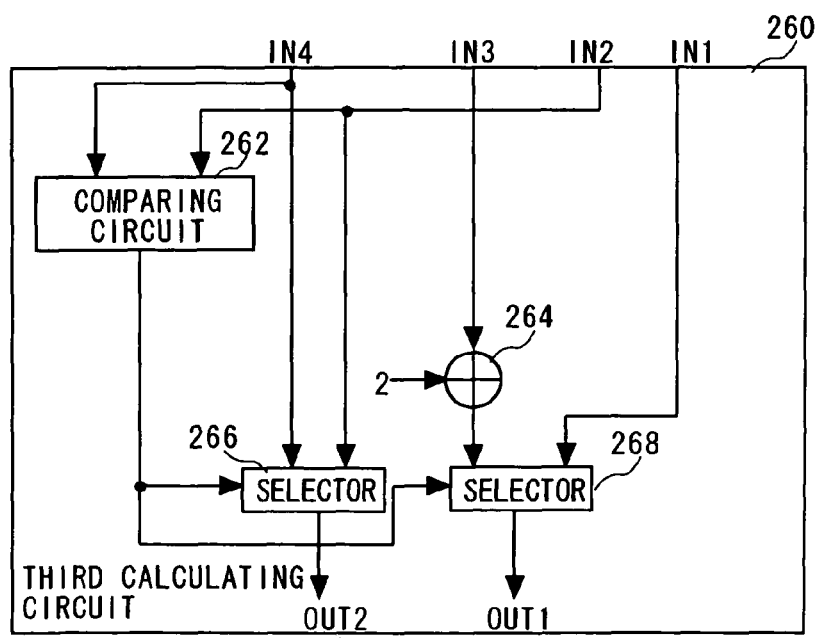
FIG. 9 is a diagram showing a third calculating circuit in the peak value candidate selecting part shown in FIG. 6.

FIG. 9 shows the third calculating circuit 260. The third calculating circuit 260 receives outputs Out2 and Out1 of the second calculating circuit 250, and outputs Out2 and Out1 of the first calculating circuit 240 as inputs In4, In3, In2, and In1, and includes a comparing circuit 262, an adder 264, a selector 266, and a selector 268. The comparing circuit 262 compares the element In4 with the element In2, and outputs the signal indicating the comparison result to the two selectors. More specifically, the comparing circuit 262 outputs "high" when In4 is larger than In2, and outputs "low" when In4 is equal to or smaller than In2. The selector 266 selects In4 to output In4 as Out2 upon receiving of "high" indicating that In4 is larger than In2 from the comparing circuit 262. On the other hand, the selector 266 outputs In2 as Out2 upon receiving of "low". Further, the selector 268 outputs the result of adding In3 and "2" by the adder 264 to Out1 as the positional information of In4 ("2" or "3") upon receiving of "high" indicating that In4 is larger than In2 from the comparing circuit 262, and outputs the positional information In1 of In2 ("0" or "1") as Out1 upon receiving of "low".

Figure 10:
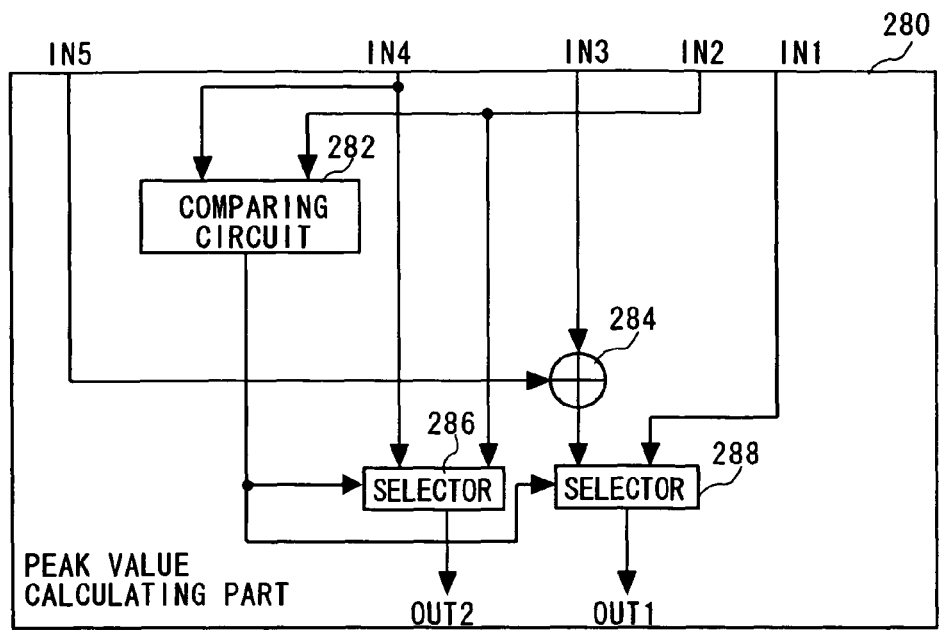
FIG. 10 is a diagram showing the peak value calculating part in the microprocessor shown in FIG. 5.

FIG. 10 shows the peak value calculating part 280. The peak value calculating part 280 receives the offset from the address generator 210, the maximum value candidate from the peak value candidate selecting part 230, the positional information thereof, the maximum value from the first storage part 292, and the offset from the second storage part 294 as the inputs In5, In4, In3, In2, and In1, respectively. The peak value calculating part 280 includes a comparing circuit 282, an adder 284, a selector 286, and a selector 288.

The comparing circuit 282 compares the input In4 (maximum value candidate) with In2 (maximum value which is being held), and outputs the signal indicating the comparison result to the two selectors. More specifically, the comparing circuit 282 outputs "high" when In4 is larger than In2, for example, and outputs "low" when In4 is equal to or smaller than In2. The selector 286 selects In4 and outputs In4 as Out2 upon receiving of "high" indicating that In4 is larger than In2 from the comparing circuit 282. On the other hand, the selector 286 outputs In2 as Out2 upon receiving of "low". Further, the selector 288 outputs the result of adding In3 (positional information of maximum value candidate) and In5 (offset from the address generator 210) by the adder 284 as Out1 upon receiving of "high" indicating that In4 is larger than In2 from the comparing circuit 282, and outputs the value of In1 as Out1 upon receiving of "low".

Note that the comparing circuit in each of the above elements may be configured by a combination of a comparator, a computing element, an adder, an adder-subtractor and the like.

Now, the process of the microprocessor 200 will be described in detail with a specific example of detecting the maximum value from eight data shown in FIG. 11. Each of these data has 16 bits and the starting address is FFF0100. Further, "0100h" of the maximum value is stored in the address "FFF010Ah", and the microprocessor 200 detects the maximum value "0100h" and an offset. If the base address is FFFF0100h, the processing result of the microprocessor 200 should be the maximum value "0100h" and its offset "000Ah".

Figure 12:
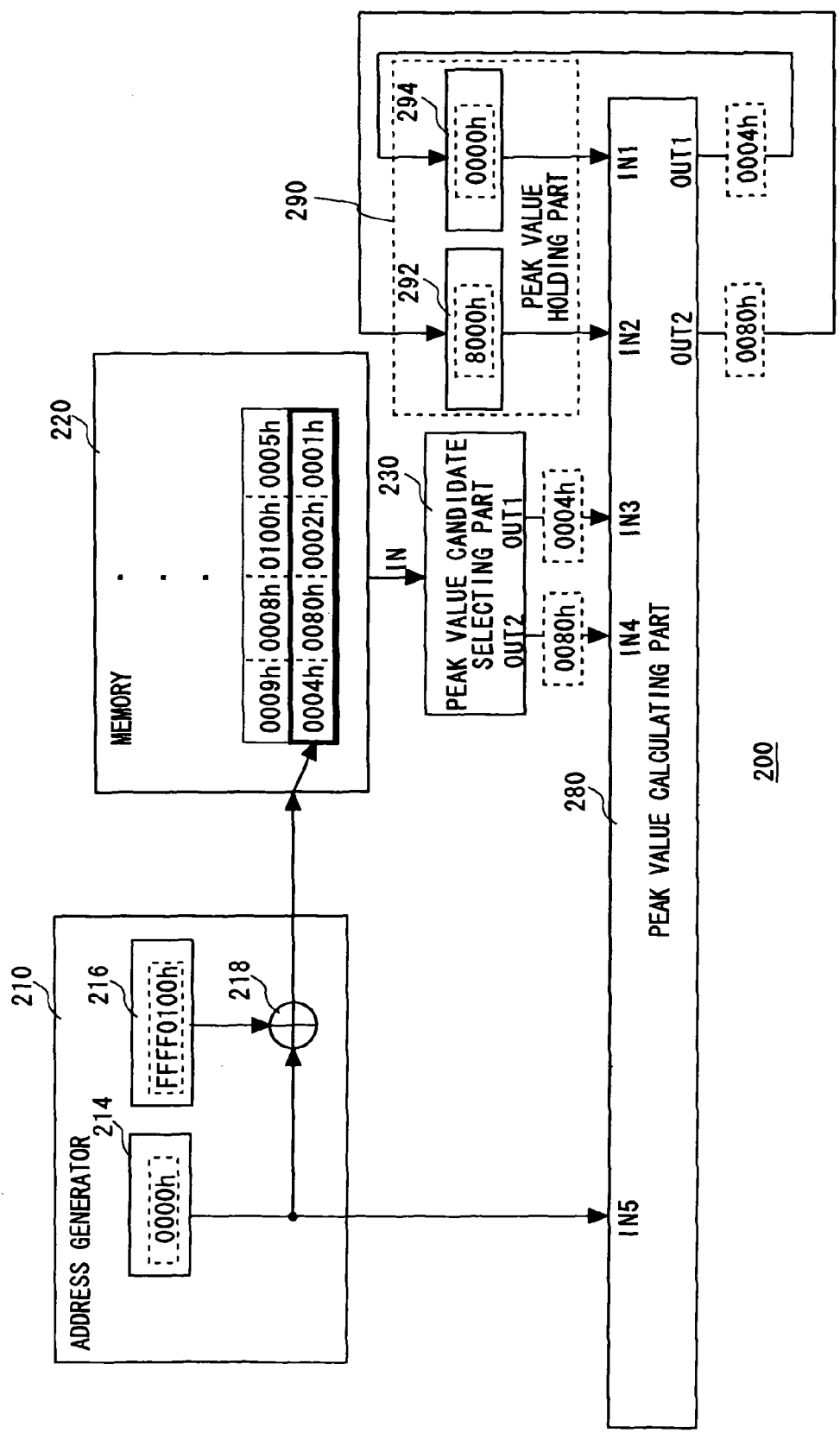
FIG. 12 is a diagram for describing an aspect of the process performed on the data example shown in FIG. 11 (using the first structure of the address generator as shown in FIG. 2)
Figure 13:
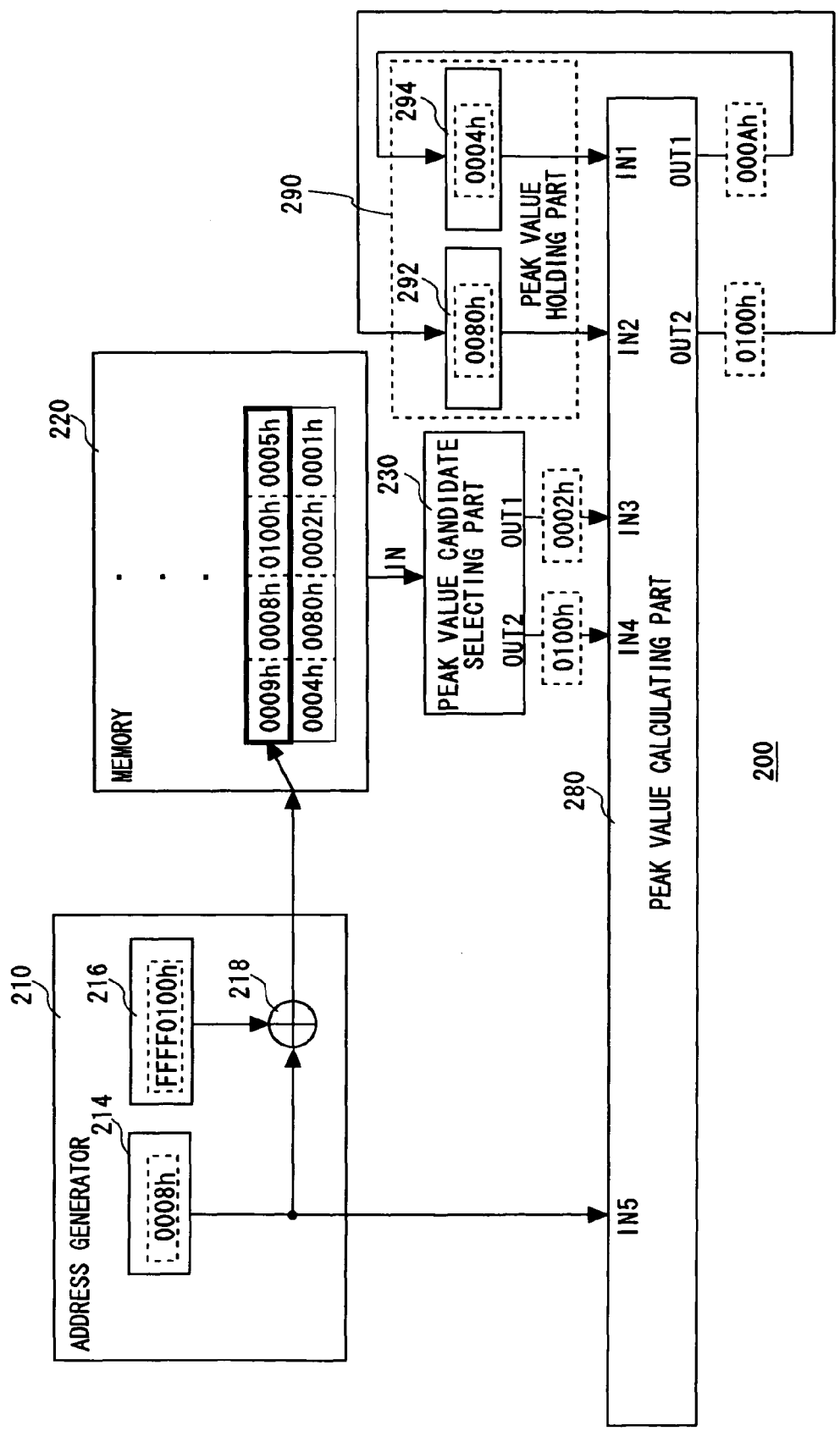
FIG. 13 is a diagram for describing an aspect of the process performed on the data example shown in FIG. 11 by the microprocessor shown in FIG. 5 (using the second structure of the address generator as shown in FIG. 3)

FIGS. 12 and 13 show content output from each component in the microprocessor 200 and the change of the stored content along with the processing steps. First, FIG. 12 will be described.

Figure 11:
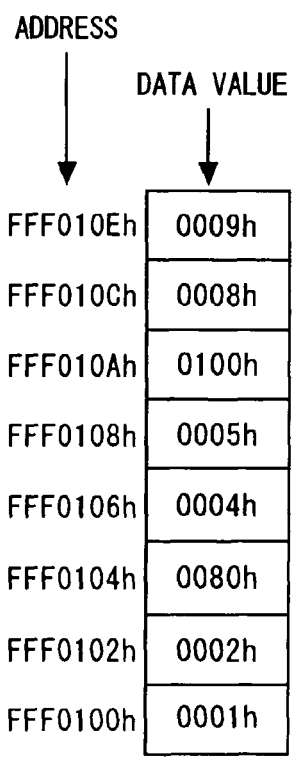
FIG. 11 is a diagram showing an example of data processed by the microprocessor shown in FIG. 5.

As shown in FIG. 12, the memory 220 stores eight data shown in FIG. 11. The first storage part 292 stores "8000h" as the maximum value, which is the minimum value of 16-bit data having symbol, and the second storage part 294 stores "0000h" as the initial value of an offset. The base address output circuit 216 of the address generator 210 stores the base address "FFFF0100h".

Upon starting the process, the offset generating circuit in the address generator 210 generates the offset "0000h" to output the generated offset to the peak value calculating part 280 and to the adder 218.

The reading address output from the adder 218 to the memory 220 is FFFF0100h, which is the starting address of the eight data stored in the memory 220.

Accordingly, the top four data (a part surrounded by thick lines in the drawing) out of the eight data stored in the memory 220 are input to the peak value candidate selecting part 230.

The peak value candidate selecting part 230 obtains the maximum value of the four data, and the maximum value is output to the peak value calculating part 280 together with a positional information. The maximum value of the four data is "0080h" and a positional information is "2"; therefore the peak value candidate selecting part 230 outputs "0080h" as Out2, and "0004h" as Out1.

The peak value candidate selecting part 230 obtains the maximum value of the four data, and the maximum value is output to the peak value calculating part 280 together with its positional information. The maximum value of the four data is "0080h" and its positional information is "2"; therefore the peak value candidate selecting part 230 outputs "0080h" as Out2, and "0004h" as Out1.

The peak value calculating part 280 compares In4 with In2, and outputs "0080h" of In4 to the first storage part 292 as Out2. The peak value calculating part 280 further adds the offset of In5 and the positional information of In4 (In3) to obtain the offset of "0080h". Then the peak value calculating part 280 outputs this offset to the second storage part 294 as Out1. Since the offset of In5 is "0000h", the offset Out1 output from the peak value calculating part 280 is "0004h" of In3.

Thus, the content held in the first storage part 292 and the second storage part 294 is updated.

The next processing will be described with reference to FIG. 13. As shown in FIG. 13, the maximum value "0080h" is stored in the first storage part 292 and the offset of the maximum value "0004h" is stored in the second storage part 294 by the first processing. The address generator 210 generates the next offset "0008h" to process the next four data to output the generated offset to the peak value calculating part 280 and to the adder 218.

The reading address output to the memory 220 by the adder 218 is "FFFF0108h", which is the starting address of latter four data out of the eight data stored in the memory 220.

Accordingly, the four data stored in the memory 220 (a part surrounded by the thick lines in the drawing) are input to the peak value candidate selecting part 230.

The maximum value of the four data is "0100h" and a positional information is "1". Therefore, the peak value candidate selecting part 230 outputs "0100h" as Out2 and outputs "0002h" as Out1.

The peak value calculating part 280 compares In4 ("0100h") with In2 ("0080h"), and outputs "0100h" of In4 to the first storage part 292 as Out2. The peak value calculating part 280 also adds the offset of In5 and the positional information of In4 (In3) to obtain the offset of "0100h". Then the peak value calculating part 280 outputs the offset to the second storage part 294 as Out1. Since the offset of In5 is "0008h", the offset Out1 output from the peak value calculating part 280 is "000Ah".

Thus, the target maximum value "0100h" is stored in the first storage part 292, and an offset "000Ah" is stored in the second storage part 294.

The microprocessor 200 according to the present embodiment is the one in which the principle of the present invention is specified; therefore the effect described above in the description of the principle can be obtained.

Second Embodiment

Figure 14:
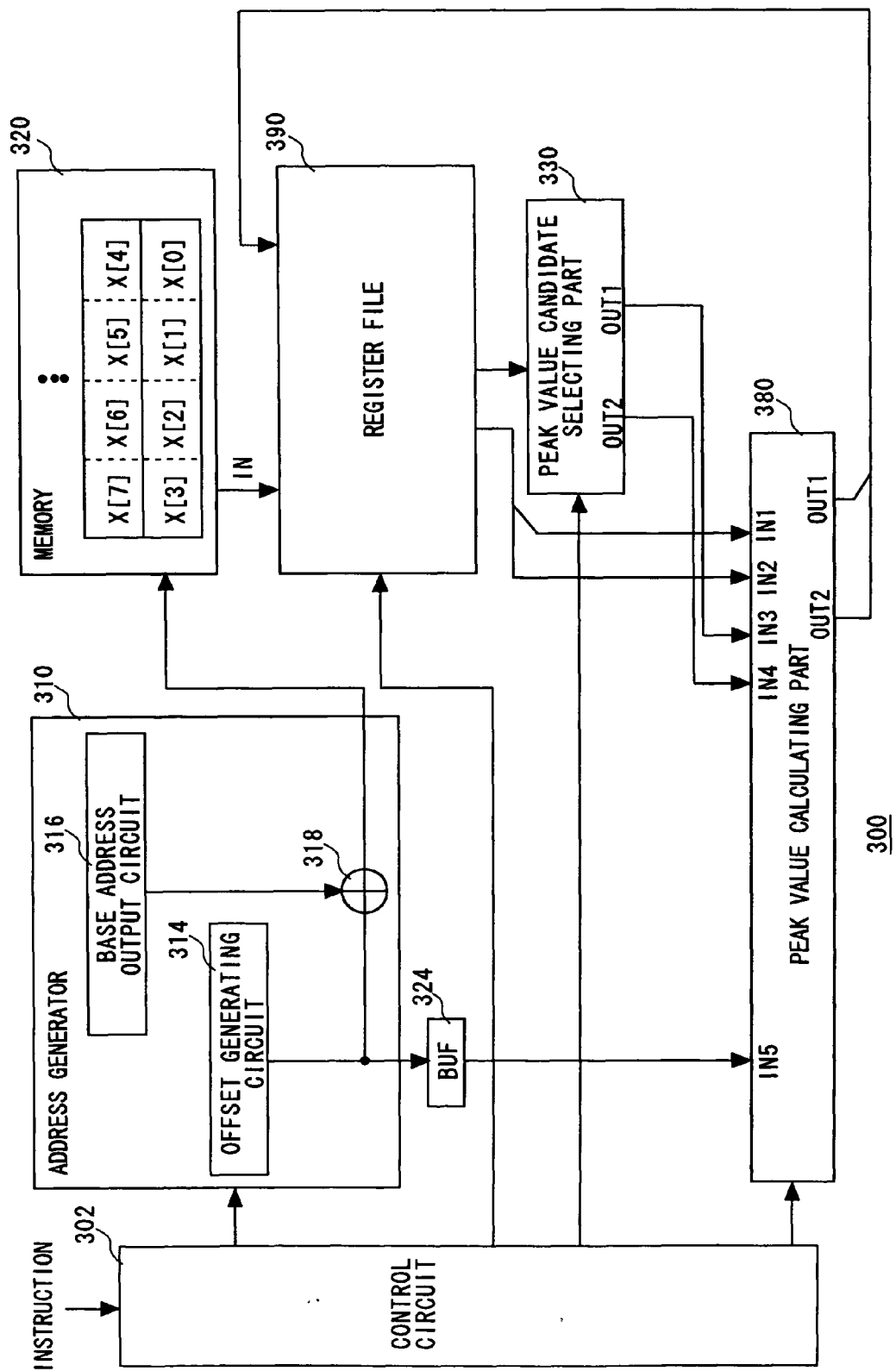
FIG. 14 is a diagram showing a microprocessor according to a second embodiment of the present invention.

FIG. 14 shows a microprocessor 300 according to the second embodiment of the present invention. The microprocessor 300 includes a control circuit 302, an address generator 310, a memory 320, a buffer (hereinafter referred to as BUF) 324, a peak value candidate selecting part 330, a peak value calculating part 380, and a register file 390.

The address generator 310 and the memory 320 have the same structure as that of the address generator 210 and the memory 220 of the microprocessor according to the first embodiment; therefore the overlapping description thereof will be omitted.

The control circuit 302 decodes an instruction (instruction detecting the maximum value or instruction detecting the minimum value) from a CPU (Central Processing Unit) which is not shown in the drawing. Then the control circuit 302 forces the peak value candidate selecting part 330 and the peak value calculating part 380 to perform the processing depending on the instructions, and designates the register to be read out for the register file 390.

The BUF 324 is provided between the offset generating circuit 314 and the peak value calculating part 380 to temporarily store the offset output to the peak value calculating part 380 from the offset generating circuit 314. The BUF 324 may be configured by a register, or may either be a single register or a plurality of registers such as a register file. When the BUF 324 is formed by the plurality of registers, it is possible to designate by the instruction operand where in the register the offset output from the address generator 310 is stored.

The register file 390 is provided for detecting the maximum value or the minimum value, and is formed by a plurality of registers having 64-bit width. The register file 390 includes a register for temporarily storing the data read out from the memory 320 before passing the data to the peak value candidate selecting part 330 in addition to a register functioning as the peak value holding part which temporarily stores the calculation result of the peak value calculating part 380. The peak value candidate selecting part 330 selects the peak value (maximum value of the four data in detecting the maximum value, and minimum value of the four data in detecting the minimum value) of the four data read out from the register file 390 to output the selected peak value to Out2 as the peak value candidate and outputs "positional information of the peak value candidate *2" to Out1.

The peak value calculating part 380 receives the offset output from the address generator 310 through the BUF 324, outputs Out2 and Out1 of the peak value candidate selecting part 330, the peak value stored in the register file 390, and an offset as the inputs In5, In4, In3, In2, and In1, respectively, and first compares In4 with In2.

When In4 and In2 satisfy the magnitude relation corresponding to the instruction to obtain the maximum value or the minimum value as a result of comparison, the peak value calculating part 380 determines In4 (peak value candidate) as the new peak value. In this case, the peak value calculating part 380 further detects the offset of In4 using In3 and the offset In5.

On the other hand, when In4 and In2 do not satisfy the magnitude relation, the peak value calculating part 380 determines In2 and In1 as the new peak value and the offset of the new peak value, respectively.

The phrase "magnitude relation corresponding to the instruction to obtain the maximum value or the minimum value" of In4 and In2 means "In4>In2" in detecting the maximum value and "In4<In2" in detecting the minimum value.

The specific configuration of the peak value candidate selecting part 330 and the peak value calculating part 380 may correspond to those of the microprocessor 200 of the first embodiment; therefore the detailed description thereof will be omitted.

The processing in the microprocessor 300 shown in FIG. 14 will be described in detail taking a case in which the instruction from the CPU indicates "detecting the maximum value" as an example.

The step after the first processing, which means after the processing for the top four data "0001h", "0002h", "0080h", and "0004h", will be described taking the eight data shown in FIG. 11 as an example.

Now, in order to obtain four data to be processed, the next four data stored in the memory 320 are stored in the register file 390 from the memory 320 by executing the load instruction, for example. The operation in the load instruction will be described with reference to FIG. 15. The offset generating circuit 314 in the address generator 310 generates the offset "0008h" to store the offset in the BUF 324. The adder 318 adds the offset "0008h" generated by the offset generating circuit 314 and the base address "FFFF0100h" output from the base address output circuit 316 to obtain the reading address "FFFF01008h". Then the adder 318 outputs the reading address to the memory 320. Hence, the next four data stored in the memory 320 (a part surrounded by the thick lines in the drawing) are stored in the register R1 in the register file 390 from the memory 320.

Figure 15:
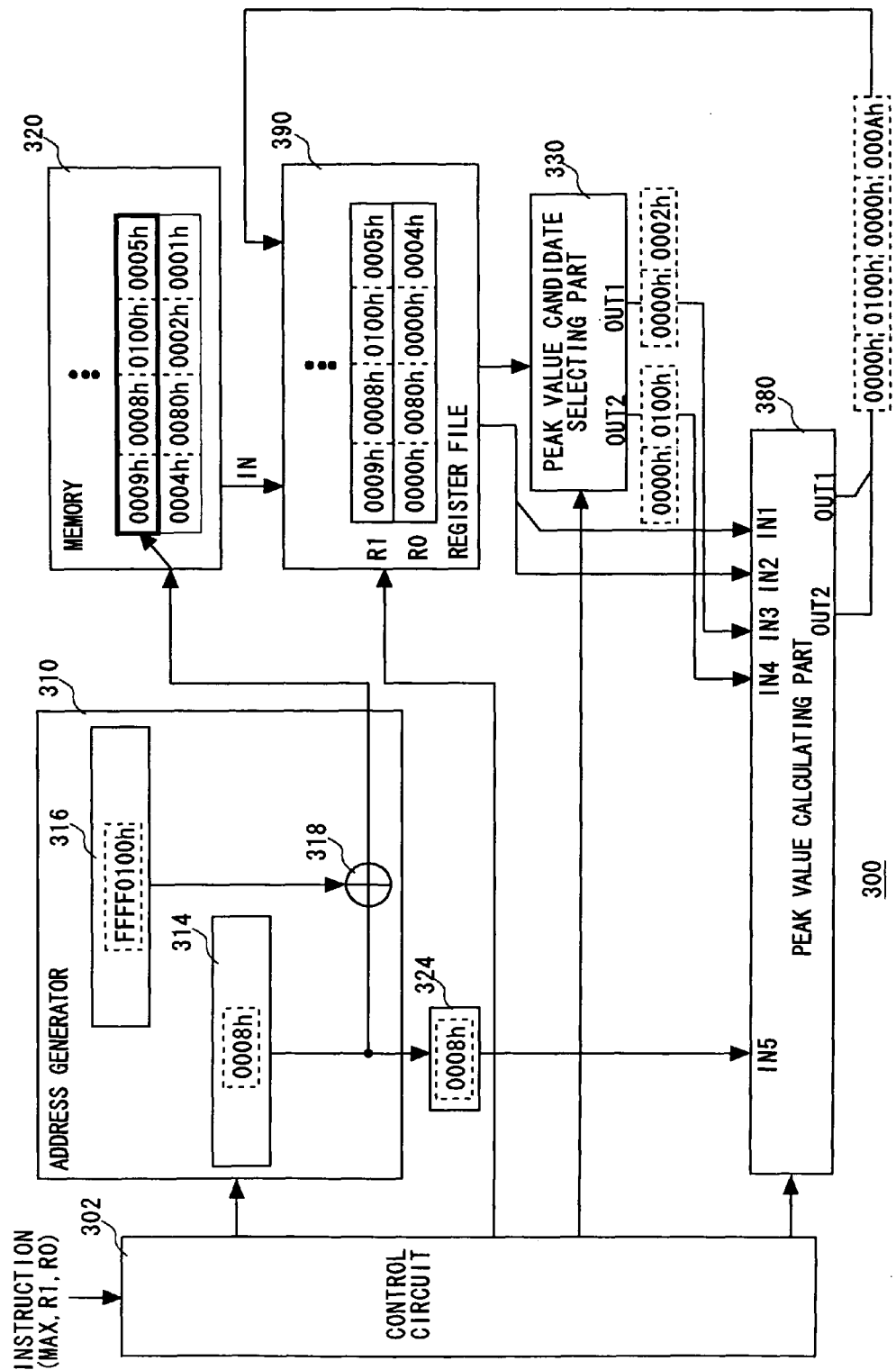
FIG. 15 is a diagram for describing an aspect of the process performed on the data example shown in FIG. 11 by the microprocessor shown in FIG. 14.

As shown in FIG. 15, the instruction from the CPU is (MAX R1, R0) in detecting the maximum value. "MAX" indicates that the maximum value is to be detected, and "R1" and "R0" indicate the register storing four data read out from the memory 320 and the register storing the calculation result of the peak value calculating part 380, respectively.

As a result of processing for the previous four data, the maximum value "0080h" and an offset "0004h" are stored in the register R0 in the register file 390 designated by the instruction by the CPU.

Although each of the maximum value and an offset has 16 bits, code extension or zero extension is performed to 32 bits. Then the maximum value and the offset are stored in the upper 32 bits and the lower 32 bits in the register R0, respectively.

The peak value candidate selecting part 330 reads out the four data stored in the register R1, selects the largest data as the maximum value candidate to output the selected data as Out2, and outputs "positional information of the maximum value candidate *2" as Out1. As shown in the drawing, the four data stored in the register R1 are "0009", "0008", "0100h", and "0005h", and each of the positional information is "3", "2", "1", and "0". Therefore, the maximum value candidate "0100h" and "0002h" which is twice larger than a positional information "1" are output from the peak value candidate selecting part 330.

The peak value candidate selecting part 330 also executes zero extension or code extension on Out2 and Out1 to 32 bits so as to output 64-bit data. As shown in the drawing, the peak value candidate selecting part 330 outputs 64-bit data of "0000h, 0100h, 0000h, 0002h".

The peak value calculating part 380 compares In4 (maximum value candidate) which is the upper 32 bits in the output of the peak value candidate selecting part 330 with In2 (maximum value which is being held) which is the upper 32 bits of 64 bits read out from the register R0. When In4 is larger than In2, In4 is determined as the new maximum value. Then the offset is obtained by using In3 ("0002h") and the offset In5 ("0008h") stored in the BUF 324 and the offset is written into the register R0 as the new value together with In4. On the other hand, when In4 is equal to or smaller than In2, the peak value calculating part 380 writes In2 and an offset In1 into the register R0.

Since In4 is "0100h" and In2 is "0080h" in this example, "0100h" of In4 is determined as the maximum value, and "000Ah" is calculated as an offset.

The peak value calculating part 380 also performs zero extension or code extension on each of the maximum value and an offset to 32 bits, so as to write 64-bit data of "0000h, 0100h, 0000h, 000Ah" whose upper 32 bits are maximum value and lower 32 bits are offset into the register R0.

Accordingly, the target maximum value "0100h" and an offset are stored in the upper 32 bits and the lower 32 bits of the register R0, respectively.

The microprocessor 300 according to the present embodiment can achieve the same effect as that in the microprocessor 200 of the first embodiment.

Further, the BUF 324 is provided between the address generator 310 and the peak value calculating part 380 so as to temporarily stores the offset output from the offset generating circuit 314. Moreover, the register file 390 is provided between the memory 320 and the peak value candidate selecting part 330 so as to temporarily store the data read out from the memory 320. Accordingly, it is possible to normally operate the microprocessor executing the pipeline processing even when there is latency.

Further, since the peak value holding part storing the calculation result of the peak value calculating part 380 and the storing part storing the data read out from the memory 320 are formed to share one register file 390, it is possible to perform simple control.

Third Embodiment

Figure 16:
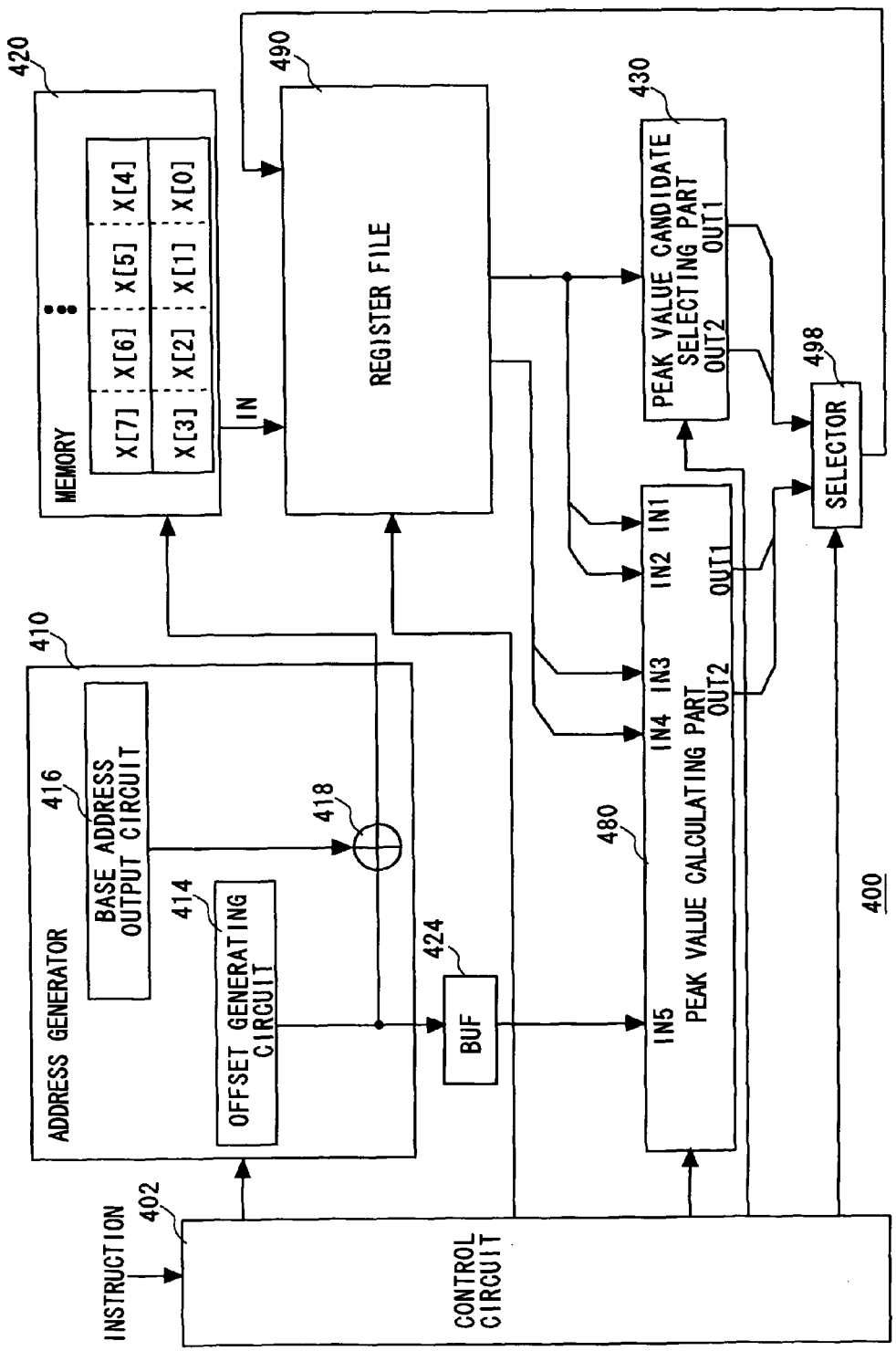
FIG. 16 is a diagram showing a microprocessor according to a third embodiment of the present invention.

FIG. 16 shows a microprocessor 400 according to the third embodiment of the present invention. The microprocessor 400 includes a control circuit 402, an address generator 410, a memory 420, a BUF 424, a peak value candidate selecting part 430, a peak value calculating part 480, and a register file 490.

The configurations of the address generator 410, the memory 420, and the BUF 424 are the same as those in the microprocessor 300 of the second embodiment; therefore the overlapping description thereof will be omitted.

The control circuit 402 performs controlling of a selector 498 in addition to the processing performed by the control circuit 302 in the microprocessor 200 of the second embodiment.

As is the same in the register file 390 in the microprocessor 200 of the second embodiment, the register file 490 includes a register temporarily storing the data read out from the memory 420 before outputting the data to the peak value candidate selecting part 430, and a register storing the calculation result of the peak value calculating part 480. The register file 490 further includes a register temporarily storing an output of the peak value candidate selecting part 430.

The peak value candidate selecting part 430 performs substantially the same processing as that of the peak value candidate selecting part 330 in the microprocessor 200. However, instead of outputting the outputs Out2 (peak value candidate) and Out1 (positional information of the peak value candidate *2) to the peak value calculating part 480, the peak value candidate selecting part 430 outputs those data to the selector 498.

The peak value calculating part 480 performs the same processing as that of the peak value calculating part 380 in the microprocessor 200. However, instead of directly outputting the output Out2 (new peak value) and the output Out1 (offset of the new peak value) to the register in the register file 490, the peak value calculating part 480 outputs those data to the selector 498.

The selector 498 selects the output of the peak value candidate selecting part 430 or the output of the peak value calculating part 480 according to the control of the control circuit 402 so as to output the selected data to the register file 490. More specifically, the selector 498 outputs the output of the peak value candidate selecting part 430 to the register file 490 when the processing by the peak value candidate selecting part 430 is executed and the outputs Out2 (peak value candidate) and Out1 (positional information of the peak value candidate *2) are obtained. Then the output of the peak value calculating part 480 is output to the register file 490 when the processing by the peak value calculating part 480 is executed and the output Out2 (new peak value) and the output Out1 (offset of the new peak value) are obtained.

Now, the processing in the microprocessor 400 shown in FIG. 16 will be described in detail taking a case in which the instruction from the CPU indicates "detecting the maximum value" as an example.

Again, the step after the first processing, which means after the processing for the top four data "0001h", "0002h", "0080h", and "0004", will be described taking the eight data shown in FIG. 11 as an example.

Figure 17:
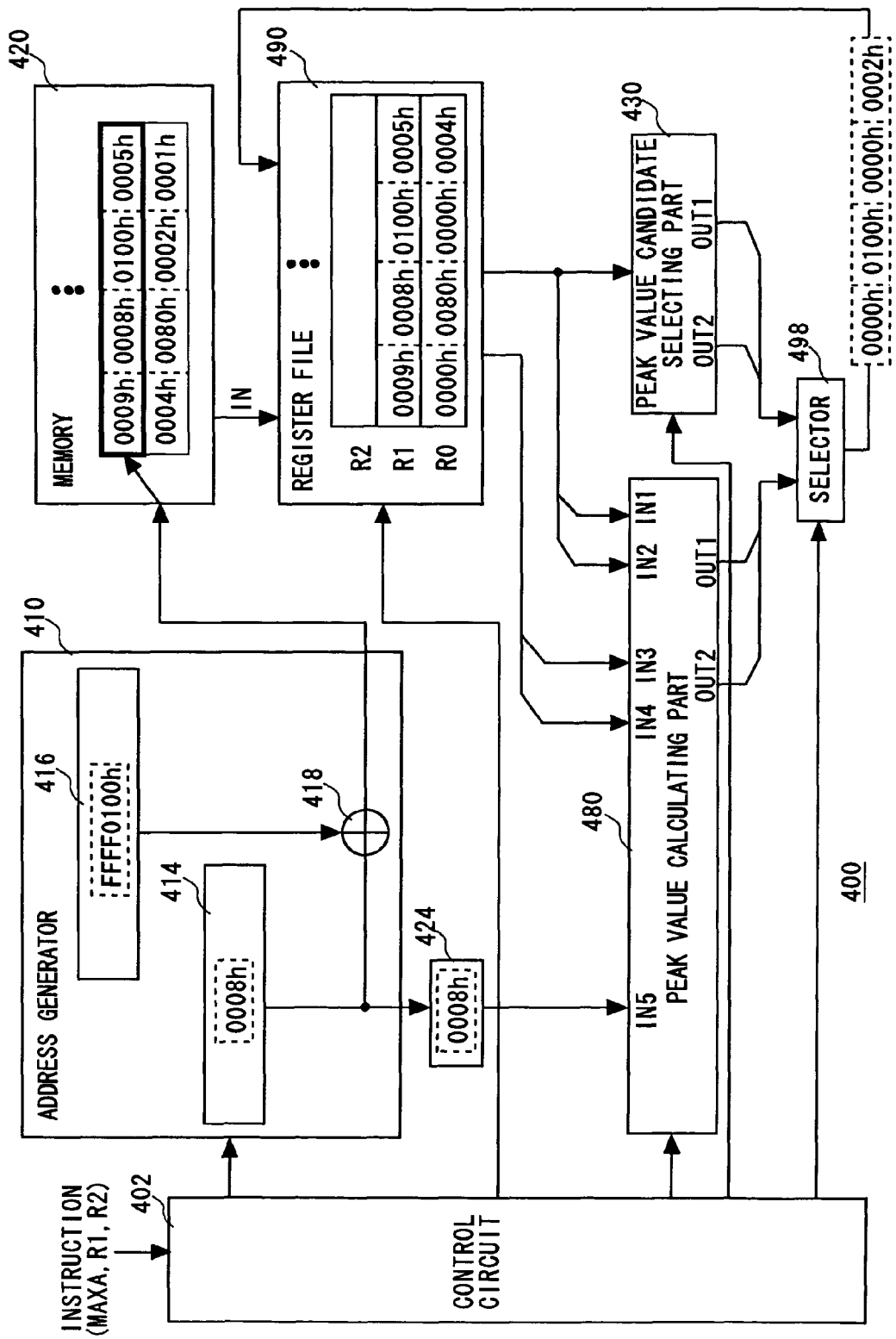
FIG. 17 is a diagram describing an aspect of the process performed on the data example shown in FIG. 11 by the microprocessor shown in FIG. 16 (using the first structure of the address generator as shown in FIG. 2)

In order to obtain four data to be processed next, the next four data stored in the memory 420 are stored in the register file 490 from the memory 420 by executing the load instruction, for example. The operation in the load instruction will be described with reference to FIG. 17. The offset generating circuit 414 in the address generator 410 generates the offset "0008h" to store the offset in the BUF 424. The adder 418 adds the offset "0008h" generated by the offset generating circuit 414 and the base address "FFFF0100h" output from the base address output circuit 416 to obtain the reading address "FFFF01008h". Then the adder 418 outputs this reading address to the memory 420. Accordingly, the next four data stored in the memory 420 (a part surrounded by the thick lines in the drawing) are stored in the register R1 in the register file 490 from the memory 420.

As a result of the processing for the previous four data, the zero extension or the code extension is performed on each of the maximum value "0080h" and an offset "0003h" to 32 bits, and the maximum value and the offset are stored in the upper 32 bits and the lower 32 bits of the register R0 in the register file 490 designated by the instruction by the CPU.

The peak value candidate selecting part 430 operates in response to the "MAXA" instruction. More specifically, the peak value candidate selecting part 430 reads out four data stored in the register R1 to select the maximum value. Then the peak value candidate selecting part 430 outputs the selected maximum value as Out2 as the maximum value candidate and outputs "positional information of the maximum value candidate *2" as Out1. As shown in the drawing, the four data stored in the register R1 are "0009h", "0008h", "0100h", and "0005h", and each of a positional information is "3", "2", "1", and "0". Therefore, the maximum value candidate "0100h" and "0002h" which is twice larger than a positional information "1" are output from the peak value candidate selecting part 430.

Since the selector 498 selects the output of the peak value candidate selecting part 430 in response to the "MAXA" instruction, the outputs Out2 and Out1 of the peak value candidate selecting part 430 are output from the selector 498 to the register file 490. Since the zero extension or the code extension is performed on each of the outputs Out2 and Out1 of the peak value candidate selecting part 430 to 32 bits, 64-bit data of "0000h, 0100h, 0000h, 0002h" are output from the selector 498.

The next processing will be described with reference to FIG. 18.

Figure 18:
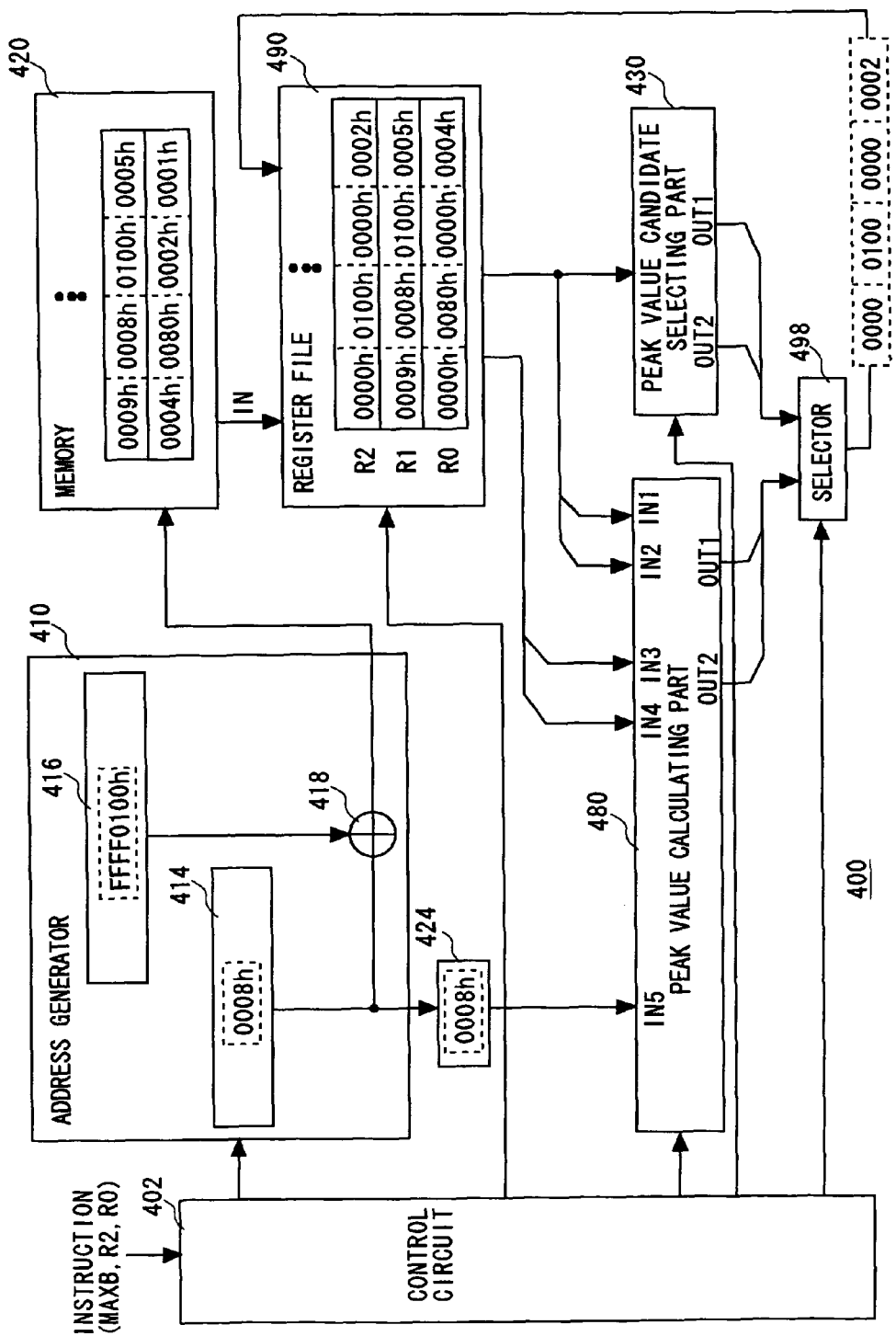
FIG. 18 is a diagram describing an aspect of the process performed on the data example shown in FIG. 11 by the microprocessor shown in FIG. 16 (using the second structure of the address generator as shown in FIG. 3)
Figure 19:
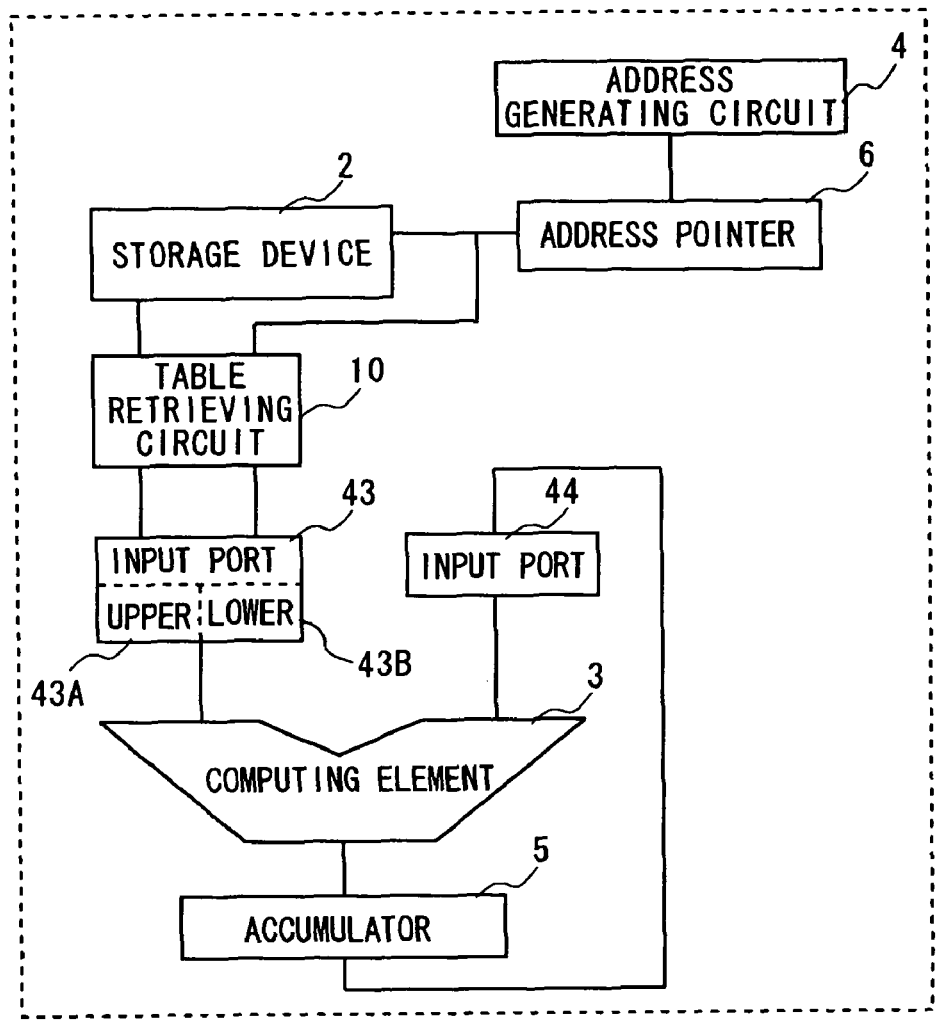
FIG. 19 is a diagram for describing a related technique.

As shown in FIG. 18, 64-bit data of "0000h, 0100h, 0000h, 0002h" of the processing result of the peak value candidate selecting part 430 are stored in the register R2.

Next, in order to obtain the maximum value, the instruction (MAXB R2, R0) from the CPU is input. "MAXB" indicates "detecting the maximum value" and "R2" and "R0" designate the register storing the maximum value candidate selected by the peak value candidate selecting part 430 and "positional information of the maximum value candidate *2" and the register storing the output of the peak value calculating part 480, respectively.

The peak value calculating part 480 operates in response to the "MAXB" instruction. More specifically, the peak value calculating part 480 compares In4 (maximum value candidate) of the upper 32 bits of the 64-bit data read out from the register R2 with In2 (maximum value which is being held) of the upper 32 bits of the 64-bit data read out from the register R0. When In4 is larger than In2, In4 is determined as the new maximum value. Then the offset is detected by In3 ("0002h") of the lower 32 bits of the 64-bit data read out from the register R2 and the offset In5 ("0008h") stored in the BUF 424, and the offset is written into the register R0 as the new value together with In4. On the other hand, when In4 is equal to or smaller than In2, the peak value calculating part 480 writes In2 and an offset In1 into the register R0.

Accordingly, the target maximum value "0100h" and an offset are stored in the upper 32 bits and the lower 32 bits in the register R0, respectively.

The microprocessor 400 of the present embodiment can achieve the same effect as in the microprocessor 200 of the first embodiment and the microprocessor 300 of the second embodiment.

Further, in the microprocessor 400, the register file 490 further includes a register temporarily storing the processing result of the peak value candidate selecting part 430, and the selector 498 alternately selects the output of the peak value candidate selecting part 430 and the peak value calculating part 480 to output the selected data to the register file 490. In such a configuration, since the peak value candidate selecting part 430 and the peak value calculating part 480 do not operate at the same time, the internal resource such as a comparing circuit can be shared and the circuit size can be reduced.

It is apparent that the present invention is not limited to the above embodiments, but may be modified and changed without departing from the scope and spirit of the invention.

What is claimed is:

1. A microprocessor executing a peak value obtaining process obtaining a peak value out of a plurality of data, the peak value being a maximum value or a minimum value, the microprocessor comprising:
   an address generator sequentially generating a reading address and outputting the generated reading address;
   a data storing part outputting n-bit data having a starting point of the reading address output from the address generator;
   a peak value candidate selecting part selecting an element including a peak value out of a plurality of elements forming the n-bit data output from the data storing part as a peak value candidate when m-bit (m: multiple integral of an addressing unit) data of one data unit is expressed as one element, the peak value candidate selecting part further outputting the peak value candidate together with a positional information, the positional information indicating a position of the peak value candidate in an element column in which the plurality of elements are aligned in an address order;
   a peak value holding part holding a peak value and an address of an element including the peak value; and
   a peak value calculating part calculating an address of the element of the peak value candidate using the positional information of the peak value candidate and the reading address, outputting the calculated address and the peak value candidate to the peak value holding part, and updating content held in the peak value holding part on a condition that the peak value candidate output from the peak value candidate selecting part and the peak value held in the peak value holding part satisfy a magnitude relation corresponding to an instruction to obtain the maximum value or the minimum value.

2. The microprocessor according to claim 1, wherein
the reading address includes an offset and a base address, the address generator outputs only the offset to the peak value calculating part, and
the peak value calculating part detects the offset of the peak value candidate.

3. The microprocessor according to claim 1, wherein the peak value holding part comprises a register.

4. The microprocessor according to claim 2, wherein the peak value holding part comprises a register.

5. The microprocessor according to claim 1, further comprising a register file, the register file including:
   a register functioning as the peak value holding part; and
   a register temporarily storing the n-bit data from the data storing part before outputting the n-bit data to the peak value candidate selecting part.

6. The microprocessor according to claim 2, further comprising a register file, the register file including:
   a register functioning as the peak value holding part; and
   a register temporarily storing the n-bit data from the data storing part before outputting the n-bit data to the peak value candidate selecting part.

7. The microprocessor according to claim 1, further comprising:
   a selector selecting a processing result of the peak value candidate selecting part or a processing result of the peak value calculating part and outputting the selected processing result; and
   a register file including a first register and a second register, the first register functioning as the peak value holding part and storing the processing result of the peak value calculating part output from the selector, the second register storing the processing result of the peak value candidate selecting part output from the selector, wherein
   the peak value calculating part reads out content stored in the first register and the second register and processes the content.

8. The microprocessor according to claim 2, further comprising:
   a selector selecting a processing result of the peak value candidate selecting part or a processing result of the peak value calculating part and outputting the selected processing result; and
   a register file including a first register and a second register, the first register functioning as the peak value holding part and storing the processing result of the peak value calculating part output from the selector, the second register storing the processing result of the peak value candidate selecting part output from the selector, wherein
   the peak value calculating part reads out content stored in the first register and the second register and processes the content.

9. The microprocessor according to claim 7, wherein the register file further includes a register temporarily storing the n-bit data from the data storing part before outputting the n-bit data to the peak value candidate selecting part.

10. The microprocessor according to claim 8, wherein the register file further includes a register temporarily storing the n-bit data from the data storing part before outputting the n-bit data to the peak value candidate selecting part.

11. The microprocessor according to claim 1, further comprising a buffer temporarily storing an output from the address generator to the peak value calculating part.

12. The microprocessor according to claim 2, further comprising a buffer temporarily storing an output from the address generator to the peak value calculating part.

13. The microprocessor according to claim 3, further comprising a buffer temporarily storing an output from the address generator to the peak value calculating part.

14. The microprocessor according to claim 4, further comprising a buffer temporarily storing an output from the address generator to the peak value calculating part.

15. The microprocessor according to claim 5, further comprising a buffer temporarily storing an output from the address generator to the peak value calculating part.

16. The microprocessor according to claim 6, further comprising a buffer temporarily storing an output from the address generator to the peak value calculating part.

17. The microprocessor according to claim 7, further comprising a buffer temporarily storing an output from the address generator to the peak value calculating part.

18. The microprocessor according to claim 9, further comprising a buffer temporarily storing an output from the address generator to the peak value calculating part.

19. The microprocessor according to claim 10, further comprising a buffer temporarily storing an output from the address generator to the peak value calculating part.

20. A method of processing data, comprising:
when a peak value obtaining process obtaining a peak value out of a plurality of data is executed in a microprocessor, the peak value being a maximum value or a minimum value,
sequentially generating a reading address;
reading out n-bit data having a starting point of the reading address from a storing part;
selecting an element including a peak value out of a plurality of elements forming the n-bit data as a peak value candidate when m-bit (m: multiple integral of an addressing unit) data of one data unit is expressed as one element and outputting the peak value candidate together with a positional information, the positional information indicating a position of the peak value candidate in an element column in which the plurality of elements are aligned in an address order;
holding a peak value and an address of an element including the peak value; and
calculating an address of the element of the peak value candidate using the positional information of the peak value candidate and the reading address and updating the address and the peak value which are being held with the calculated address and the peak value candidate on a condition that the peak value candidate and the peak value satisfy a magnitude relation corresponding to an instruction to obtain the maximum value or the minimum value.

* * * * *